(12) United States Patent
Hall et al.

(10) Patent No.: US 12,194,793 B2
(45) Date of Patent: Jan. 14, 2025

(54) TYRE

(71) Applicant: AUTOMOTIVE FUSION LIMITED, West Midlands (GB)

(72) Inventors: Gregory John Hall, Warwickshire (GB); Ali Essam Kubba, Birmingham (GB)

(73) Assignee: Automotive Fusion Limited, Birmingham (GB)

( * ) Notice: Subject to any disclaimer, the term of this patent is extended or adjusted under 35 U.S.C. 154(b) by 465 days.

(21) Appl. No.: 17/261,151

(22) PCT Filed: Jul. 18, 2019

(86) PCT No.: PCT/GB2019/052006
§ 371 (c)(1),
(2) Date: Jan. 18, 2021

(87) PCT Pub. No.: WO2020/016584
PCT Pub. Date: Jan. 23, 2020

(65) Prior Publication Data
US 2023/0059312 A1 Feb. 23, 2023

(30) Foreign Application Priority Data

Jul. 18, 2018 (GB) .................................. 1811752.3

(51) Int. Cl.
*B60C 11/00* (2006.01)
*B60C 11/16* (2006.01)
(Continued)

(52) U.S. Cl.
CPC ........ *B60C 99/003* (2013.01); *B60C 11/0041* (2013.01); *B60C 11/1612* (2013.01);
(Continued)

(58) Field of Classification Search
CPC ............. B60C 11/0041; B60C 11/1612; B60C 99/003; B60C 23/002; B60C 2019/004; B29D 2030/0088; B29D 2020/0088
See application file for complete search history.

(56) References Cited

U.S. PATENT DOCUMENTS 4,319,620 A * 3/1982 Knill ....................... B60C 11/18
152/209.5
6,350,963 B1 2/2002 Gray
(Continued)

FOREIGN PATENT DOCUMENTS

CN 103818247 A 5/2014
CN 105751821 A 7/2016
(Continued)

OTHER PUBLICATIONS

Machine translation for Japan 2016-203829 (Year: 2023).*
(Continued)

*Primary Examiner* — Steven D Maki
(74) *Attorney, Agent, or Firm* — Stout, Uxa & Buyan, LLP; Donald E. Stout

(57) ABSTRACT

A tyre T for adaptively adjusting to the tyre's rolling conditions, the tyre T comprising first and second side walls (1, 2) with a contact wall (3) extending therebetween and a heater 7 for heating one or more of the first side wall (1), second side wall (2) and contact wall (3), wherein plural chambers (4, 5, 6) are defined within the tyre T, at least one of the plural chambers (4, 6) being selectively inflatable for altering the external shape of the first side wall (1), second side wall (2) and/or contact wall (3).

17 Claims, 2 Drawing Sheets

(51) Int. Cl.
  *B60C 23/00* (2006.01)
  *B60C 99/00* (2006.01)
  *B29D 30/00* (2006.01)
  *B60C 19/00* (2006.01)

(52) U.S. Cl.
  CPC .... *B60C 23/002* (2013.01); *B29D 2030/0088* (2013.01); *B60C 2019/004* (2013.01)

(56) References Cited

U.S. PATENT DOCUMENTS

| | | | | |
|---|---|---|---|---|
| 7,066,226 | B1 * | 6/2006 | Fiore | B60C 11/18 152/209.5 |
| 2005/0205563 | A1 | 9/2005 | Hepworth et al. | |
| 2010/0206449 | A1 | 8/2010 | Jang | |
| 2011/0000733 | A1 | 1/2011 | Snavely et al. | |
| 2013/0153082 | A1 | 6/2013 | Lynar et al. | |
| 2014/0069558 | A1 * | 3/2014 | Favia | B60C 99/003 152/152.1 |
| 2016/0214434 | A1 | 7/2016 | Wood | |

FOREIGN PATENT DOCUMENTS

| | | | |
|---|---|---|---|
| DE | 10102550 | A1 | 8/2002 |
| DE | 102007011025 | A1 * | 9/2008 |
| JP | 01-108804 | U | 7/1989 |
| JP | H04193612 | A | 7/1992 |
| JP | 2005-529019 | A | 9/2005 |
| JP | 2006-117144 | A | 5/2006 |
| JP | 2007-118873 | A | 5/2007 |
| JP | 2013-159322 | A | 8/2013 |
| JP | 2016-203829 | A * | 12/2016 |
| KR | 101667402 | B1 | 7/2016 |
| RU | 2526791 | C2 | 8/2014 |
| WO | 9315922 | A1 | 8/1993 |
| WO | 2009110649 | A1 | 9/2009 |
| WO | 2014057282 | A1 | 4/2014 |

OTHER PUBLICATIONS

Machine translation for German 102007011025 (Year: 2024).*
First Office Action issued in connection with corresponding Chinese App. No. 2019800603404 issued on Dec. 13, 2022.
Decision on Grant for corresponding Russian App. No. 2021103885/11 (008503) issued on Nov. 18, 2022.
International Search Report and Written Opinion issued on Oct. 1, 2019 in connection with corresponding International Application No. PCT/GB2019/050107.
Search Report issued on Dec. 10, 2018 in connection with priority Application No. GB1811752.3.
Notice of Allowance issued Sep. 5, 2023 in connection with corresponding Japanese App. No. 2021-525386.

* cited by examiner

TYRE

This invention relates generally to a tyre. More specifically, although not exclusively, this invention relates to a tyre for adaptively adjusting to the tyre's rolling conditions.

Tyres, for example pneumatic tyres, find use with land-based vehicles, such as automobiles, and also with aircraft, such as aeroplanes.

Pneumatic tyres typically comprise first and second side walls with a contact wall extending therebetween. Moreover, such pneumatic tyres are commonly manufactured from plural layers of elastomeric material. The layers include a carcass, a liner or inner layer, a bead, a belt arrangement and tread pattern. The layers are typically fitted one atop the other around a cylinder. The layers are then expanded into a mould to form the final shape of the tyre and are then cured (by application of steam, for example) to bond the layers together and hence form the tyre. A tread band may then be attached to the contact wall of the tyre T, for contacting a surface against which the tyre rolls, in use.

Customarily, pneumatic tyres are inflated to have a single pressure setting, at least whilst in motion. This may be suboptimal in terms of how the tyre functions when supporting or attached to a vehicle. For example, while the rolling conditions to which a tyre is subjected may alter (e.g. due to cornering, smooth or rough surfaces, uphill or downhill travel), the tyre pressure may remain substantially constant or may change by only a relatively minor amount. As will be appreciated, the tyre shape may, accordingly, remain substantially constant as well. Alternatively and/or additionally, external forces acting against the surface of the tyre, for example due to friction, may alter the tyre shape in ways which may detrimentally affect the performance of the tyre.

As will be appreciated, the desired or required pressure within a tyre suitable for off-road use may be significantly different to the pressure within a tyre suitable for on-road use. Furthermore, the size and/or shape of the contact patch of the tyre with the surface over which it is rolling may affect the rolling resistance and ability of the tyre to grip said surface. The shape and/or size of the contact patch, however, is substantially determined and fixed by the original shape of the tyre as constructed and by the internal pressure of the tyre to which the tyre is initially inflated, prior to its use. Although the shape and/or size of the contact patch of a conventional tyre may change during use (for example, due to applied external loads) such changes may negatively impact the performance of the tyre and are typically undesirable. Such external loads may comprise a change in the mass of a vehicle to which the tyre is attached and/or impacts against the external surface of the tyre (for example from rocky ground). As will be appreciated by one skilled in the art, differently sized and/or shaped contact patches may be beneficial in different driving conditions (for example when cornering as opposed to driving in a straight line) to relatively reduce or increase friction between the tyre and the surface over which it is rolling.

Rolling of a tyre over a surface, in use, causes wearing of the tread band of the tyre. Such wear will, eventually, cause the tyre to become unsuitable for further use (due to become unsafe and/or due to falling foul of local regulations regarding tread band depth). Accordingly, tyres have a useful lifetime. It is therefore advantageous to form tread bands from materials having relatively high wear resistance, thereby to provide a relatively long useful lifetime of the tyre. However, materials having relatively high wear resistance may have a relatively low coefficient of friction and may, accordingly, provide relatively low grip against a surface over which the tyre is rolling. Such tyres may, therefore, perform relatively poorly in conditions where high grip is required.

It is therefore a first non-exclusive object of the invention to provide a tyre which at least partially mitigates one or more of the above-identified problems. It is also a non-exclusive object of the invention to provide a tyre which is adaptable to tyre rolling conditions, e.g. to changing tyre rolling conditions. It is also a non-exclusive object of the invention to provide a tyre which is dynamically adaptable to tyre rolling conditions (e.g. to changing tyre rolling conditions). It is a non-exclusive object of the invention to provide a tyre in which its external shape may be changed, for example during rolling use. It is a non-exclusive object of the invention to provide a tyre which has a relatively long useful life and has relatively high grip.

Accordingly, a first aspect of the invention provides a tyre for adaptively adjusting to the tyre's rolling conditions, the tyre comprising first and second side walls with a contact wall extending therebetween, the tyre further comprising a heater for heating one or more of the first side wall, second side wall and contact wall.

The term "contact wall" will be understood by one skilled in the art to refer to the portion of the tyre extending between the first and second side walls and intended, in use, to contact a surface against which the tyre is rolling. The contact wall may comprise plural layers of material and/or components.

According to a second aspect of the invention, there is provided a tyre for adaptively adjusting to the tyre's rolling conditions, the tyre comprising first and second side walls with a contact wall extending therebetween, the contact wall comprising a tread band located on an external surface thereof, the tyre further comprising a heater for heating one or more of the first side wall, second side wall and contact wall.

The phrase "tread band" will be understood by one skilled in the art to refer to a structure on the external surface of the contact wall, wherein at least a portion of the tread band is intended to contact a surface over which the tyre is rolling, in use. The tread band may comprise a substantially smooth exterior surface or may be patterned.

In some embodiments of the first or second aspect, plural chambers may be defined within the tyre. One or more of the plural chambers may be selectively inflatable (e.g. while the tyre is rolling, in use) for altering the external shape of the first side wall, second side wall and/or contact wall.

Advantageously, the present invention enables the use of different materials having different properties in the tyre tread band. The adaptability of the external shape of the tyre T provides for altered shapes and/or sizes of contact patches between the tyre and a surface against which it is rolling. By altering the shape and/or size of the contact patch we have found that different materials can be used in the tread band and, in particular, that materials having different wear rates can be used, whilst maintaining a relatively long useful life of the tyre.

According to a third aspect of the invention, there is provided a tyre for adaptively adjusting to the tyre's rolling conditions, the tyre comprising first and second side walls with a contact wall extending therebetween and a heater for heating one or more of the first side wall, second side wall and contact wall, wherein plural chambers are defined within the tyre, at least one of the plural chambers being selectively inflatable (e.g. while the tyre is rolling, in use) for altering the external shape of the first side wall, second side wall and/or contact wall.

In embodiments, one, some or each of the plural chambers may be fluidly isolated or isolatable from one or more other of the plural chambers. In embodiments, one, some or each of the plural chambers may be separately inflatable from one, some or each of the other of the plural chambers.

Advantageously, heating the material of the first side wall, second side wall and/or contact wall allows a relatively reduced pressure to be used to inflate the at least one of the plural chambers (and hence alter the external shape of one or more walls of the tyre) than the pressure necessary to achieve the same inflation but absent such heating. Furthermore, alteration of the external shape of one or more walls of the tyre may be controlled more accurately and/or rapidly using the tyre of the invention. Without wishing to be bound by any particular theory it is believed that control of the heater may control the ductility of the first side wall, second side wall and/or contact wall. The elastomeric materials from which tyres are commonly manufactured are typically less resiliently deformable when relatively cold than they are when they are relatively hotter. Accordingly, when one or more wall of the tyre is heated by the heater, inflation of one or more of the plural chambers results in relatively greater deformation of the external shape of the first side wall, second side wall and/or contact wall than is the case when the tyre walls are not heated (when applying the same pressure). We have found that this enhanced control of the external shape of the one or more walls of the tyre is particularly beneficial during cold conditions, for example when the ambient temperature is relatively cold and/or during relatively early or initial use of the tyre after it has been stationary for a period of time (e.g. when a vehicle to which the tyre is attached has been parked over-night).

In some embodiments of the first and third aspects, the contact wall may comprise a tread band located on an external surface thereof.

The tread band (where provided) may comprise a first portion, e.g. located at or adjacent the first and/or second side walls of the tyre. The tread band may comprise a second portion, e.g. located at or adjacent a central region of the contact wall (for example spaced from the first and/or second side walls). The first and second portions of the tread band may be formed from the same or from different materials, e.g. from the same compounds of materials or from different compounds of materials. One of the first and second portions may be configured to provide a different coefficient of friction than does the other of the first and second portions. One of the first and second portions may comprise a different surface treatment or pattern than does the other of the first and second portions. Alternatively, the first and second portions may comprise the same surface treatment and/or pattern and/or may be configured to provide the same coefficient of friction.

The heater may be configured or configurable or arranged or arrangeable to heat (e.g. selectively) the tread band. The heater may be configured or configurable or arranged or arrangeable to heat (e.g. selectively) the first portion (where provided) of the tread band and/or the second portion (where provided) of the tread band. Preferably, the heater may be configured or configurable or arranged or arrangeable to heat (e.g. selectively) the first portion of the tread band (e.g. only or preferentially).

Advantageously, heating of a portion of the tread band may alter the materials properties of that portion of the tread band (e.g. at least temporarily). In some embodiments, heating of a portion of the tread band may improve the grip of that portion of the tread band. For example, the material of the tread band may become relatively more ductile than in an unheated condition. Accordingly, the heated portion of the tread band may generate relatively increased traction against a surface over which it is rolling. By selectively increasing the traction of one or more portions of the tread band the tyre may provide enhanced grip when required (e.g. when cornering) and relatively reduced grip at other times (e.g. when rolling in a straight line). The useful lifetime of the tyre may be thereby substantially maintained whilst providing enhanced grip characteristics as and when required.

The tyre may comprise insulation means (e.g. insulation), for example configured or arranged to control or direct heat distribution and/or flow within the tyre and/or to control heat loss from the tyre. The insulation means may comprise an insulation layer. The insulation means may be at least partially within (e.g. at least partially embedded within) the first side wall, second side wall and/or contact wall. The insulation means may be located at least partially between the heater and the external surface of the first side wall, second side wall and/or contact wall. The insulation means may be configured or arranged to at least partially prevent or reduce heat flow from the heater to or toward the tread band (where provided), e.g. to or toward the first portion and/or the second portion of the tread band (where provided).

In some embodiments, the first and second portions of the tread band (where provided) may be formed from different materials, e.g. from different compounds of materials. For example, the first portion of the tread band may be formed from a first material, e.g. and the second portion of the tread band may be formed from a second (e.g. different) material. The first material may have a relatively lower wear resistance than does the second material. The second material may have a relatively high wear resistance. The first material may be configured to provide a relatively high coefficient of friction, in use. The second material may be configured to provide a relatively low coefficient of friction, in use, for example lower than does the first material. The first and second materials may be selected to react differently to heating, e.g. by the heater. The first material may be configured to become relatively more ductile and/or to provide relatively higher coefficient of friction upon heating than does the second material.

In some embodiments, the heater may be arranged to heat the first side wall, second side wall and/or the contact wall. In some embodiments the heater may be at least partially embedded within the first side wall, second side wall and/or contact wall. The heater may comprise a heating element. The heating element may comprise a or the belt or other rigidifying element of the tyre. A or the belt or other rigidifying element may extend substantially around the circumference of the tyre. The heater may be connected or connectable to a source of electrical energy. The heater may be configured or configurable to selectively heat one or more part of the first side wall, second side wall and/or contact wall. The heater may be configured or configurable to selectively heat a first part of the first side wall, second side wall and/or contact wall to a first temperature, for example and to selectively heat a second part of the first side wall, second side wall and/or contact wall to a second temperature (e.g. different from the first temperature).

In some embodiments, the tyre may comprise a temperature sensor, for example for measuring the temperature of the first side wall, second side wall and/or contact wall. The temperature sensor may be configured to directly or indirectly measure the temperature of the first side wall, second side wall and/or contact wall. The temperature sensor may comprise a device for measuring the resistance of the heating element (where provided).

In some embodiments, the tyre may comprise an inflation means (e.g. inflation mechanism), for example for inflating one or more of the plural chambers (where provided). The inflation means may comprise one or more (e.g. a) pump, for example one or more of a rotary pump, piston pump, diaphragm pump, screw pump or other suitable type of pump. The inflation means may be located or locatable inside and/or outside of the tyre. Where the inflation means is located or locatable inside of the tyre the tyre may be configured to retain the inflation means. The inflation means may be attached or attachable to the tyre, for example to an inner surface thereof. The inflation means may be attached or attachable to one or more of the plural chambers (where provided). The inflation means may be fluidly connected (e.g. operably) to one, some or each of the plural chambers. The inflation means may comprise a manifold, for example for fluidly connecting the inflation means to one, some or each of the plural chambers.

In some embodiments, at least one of the plural chambers (where provided) may be located at or adjacent the contact wall. At least one of the plural chambers may be arranged or arrangeable to alter, in use, the external shape of the contact wall (for example a portion of the contact wall). At least one of the plural chambers may extend across a minor portion of the contact wall, between the first and second side walls. The minor portion may comprise less than half of the distance between the side walls of the tyre, say less than a third, a quarter, a fifth, a sixth of the distance between the side walls of the tyre. One, some or each of the plural chambers may have a variable volume, e.g. may be expandable or collapsible. More than one or each of the plural chambers may be inflatable, for example for altering the external shape of the tyre.

The contact wall may comprise a first region (e.g. an inboard region) at or adjacent the first side wall, a second region (e.g. an outboard region) at or adjacent the second side wall and a third region (e.g. a central region) between the first and second regions. The plural chambers (where provided) may comprise a first chamber configured or configurable to alter the shape of one of the first, second and third regions of the contact wall. The plural chambers may comprise a second chamber configured or configurable to alter the shape of another of the first, second and third regions of the contact wall. The plural chambers may comprise a third chamber configured or configurable to alter the shape of another of the first, second and third regions of the contact wall.

In some embodiments, one of the plural chambers (where provided) may comprise a further or main chamber, for example extending from the first side wall to the second side wall. The further or main chamber may have a greater volume than does one or more or each of the other of the plural chambers. The further or main chamber may be configured to operably fluidly communicate with one or more of the other plural chambers.

The tyre may be operably connected to a sensing means (e.g. sensor), for example the tyre may comprise a sensing means (e.g. sensor), for example for sensing one or more tyre rolling condition. The sensing means may be configured or configurable to monitor one or more condition of the tyre and/or of the surrounding environment of the tyre. The one or more condition of the tyre may comprise: the pressures in one or more of the plural chambers (where provided) of the tyre; the load experienced by one or more component of the tyre; the flow rate of pressurised fluid within and/or to or from chambers of the tyre and/or the inflation means (where provided). The one or more condition of the surrounding environment may comprise: the ambient temperature; the ambient pressure; the surface roughness of a surface over which the tyre is rolling or may roll; the inclination or declination of the surface over which the tyre is rolling or may roll; the sharpness of a bend around which the tyre is rolling or may roll, the material properties of the surface over which the tyre is rolling or may roll. The sensing means may comprise one or more of an optical sensor, a pressure sensor, a flow rate sensor, an image sensor, a temperature sensor, a force sensor.

The tyre may be operably connected to a control means (e.g. controller), for example the tyre may comprise a control means (e.g. controller), for example for controlling the pressure of a fluid within one or more of the plural chambers (where provided) and/or for controlling the heater (e.g. for heating the first side wall, second side wall and/or contact wall). The control means may be configured or configurable to control the heater in response to a temperature of the first side wall, second side wall and/or contact wall, e.g. measured by the temperature sensor. The control means may be configured or configurable to control the inflation means (where provided) to inflate or deflate one or more of the plural chambers (where provided), for example in response to a tyre rolling condition (e.g. sensed or measured by the sensing means, where provided). The control means may be configured or configurable to selectively increase or decrease the pressure of a fluid within one or more of the plural chambers, for example to thereby alter the shape of the tyre. The control means may be configured or configurable to control the inflation means. The control means may be configured or configurable to control the inflation means and/or the heater in response to a tyre rolling condition measured by the sensing means. The control means may comprise one or more valves. One or more valve may be associated with one, some or each of the plural chambers, for example to selectively control fluid flow into and/or out of the or each chamber. The control means may be operable to selectively control the or each valve. The control means may be configured or configurable to alter the shape of the tyre whilst it is rolling, e.g. to dynamically alter the shape of the tyre.

In some embodiments, where the first material of the tread band (where provided) has a relatively lower wear resistance than does the second material, the control means may be configured or configurable to control the inflation means (e.g. for altering the external shape of the first side wall, second side wall and/or contact wall), and/or may be configured or configurable to control the heater (e.g. for heating one or more of the first side wall, second side wall and contact wall, for example for adjusting the properties of the walls of the tyre in cold conditions, say for minimising hysteresis losses and maximising profile distortion of the tyre). The control means may be configured or configurable to control the inflation means and/or the heater dependent on and/or in response to rolling conditions of the tyre (e.g. as sensed by one or more sensors). In this way energy losses in and/or from the tyre may be relatively reduced.

Where it is mentioned that the shape of the tyre is or may be altered it will be appreciated that this may comprise altering the shape of the contact wall of the tyre, or one or more portions thereof.

The tyre may comprise a pneumatic tyre. The tyre may be suitable for use with land vehicles and/or aircraft.

According to a fourth aspect of the invention, there is provide a tyre for adaptively adjusting to the tyre's rolling conditions, the tyre comprising first and second side walls with a contact wall extending therebetween, the contact wall comprising a tread band located on an external surface thereof, wherein the tread band comprises a first portion formed of a first material and a second portion formed of a second, different, material.

In embodiments, the fifth aspect of the invention may comprise plural chambers defined with the tyre and/or a heater for heating one or more of the first side wall, second side wall and contact wall.

In some embodiments, the tyre having said heating system (e.g. heater) in conjunction with the multiple pressure chambers (e.g. plural chambers) may have the means to change its profile (e.g. external shape) while benefiting from the heating properties ability to optimise the rubber properties in cold conditions for minimal hysteresis losses and maximum profile distortion in conjunction with the optimised tread compounds (where provided) for high cornering force on the outer performance tread and harder wearing low energy loss compounds on the central economy tread working with the control system (e.g. control means or controller, where provided) and tyre inflation mechanism (e.g. inflation means, where provided) to produce the optimum distortion and temperature to reduce energy losses in the tyre.

According to a further aspect of the invention, there is provided a method of manufacturing a tyre as described herein.

For the avoidance of doubt, any of the features described herein apply equally to any aspect of the invention.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one aspect or embodiment of the invention are applicable to all aspects or embodiments, unless such features are incompatible.

Embodiments of the invention will now be described by way of example only with reference to the accompanying drawings in which.

Figure 1:
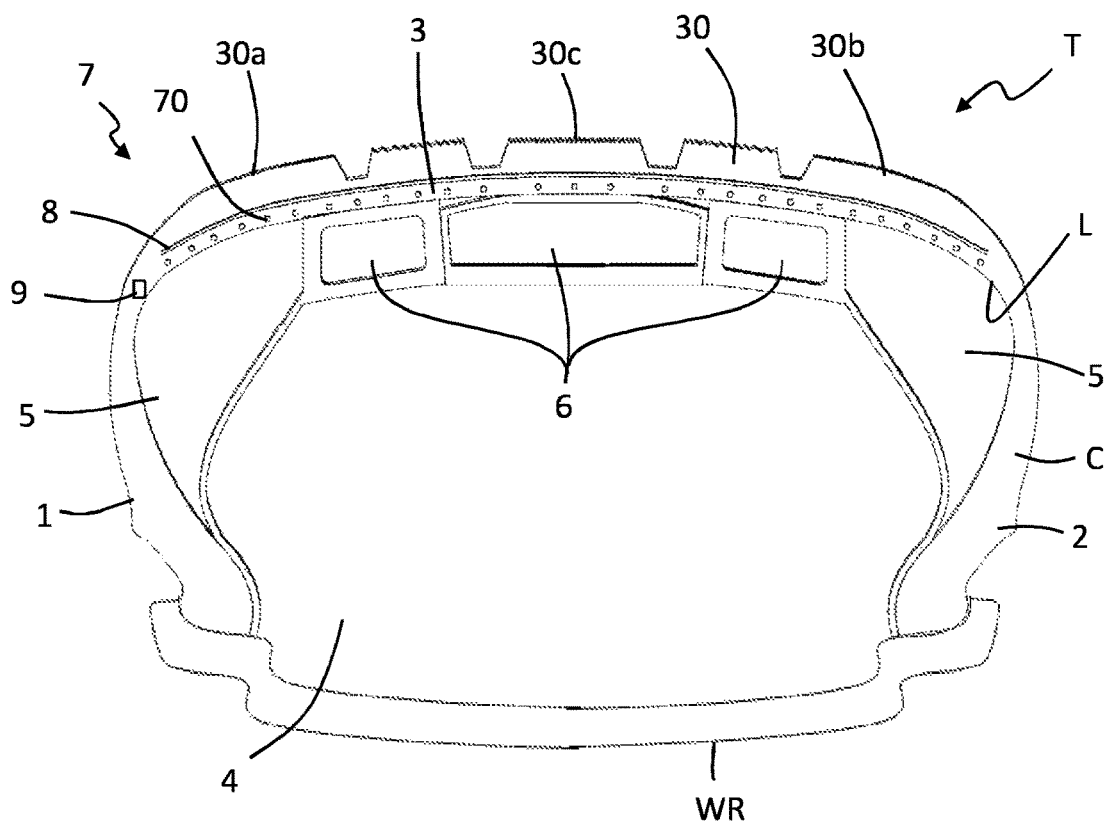
FIG. 1 is a schematic cross-sectional view of a tyre according to an embodiment of the invention fitted to a wheel rim.
Figure 2:
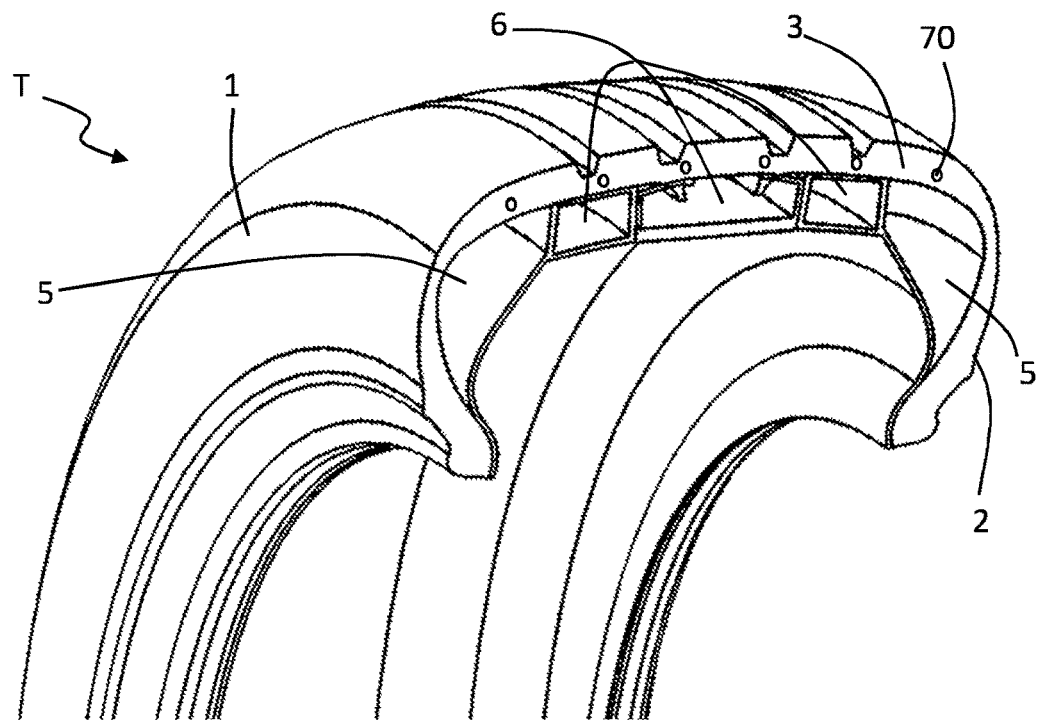
FIG. 2 is a partial cut-away perspective view of the tyre shown in FIG. 1.
Figure 3:
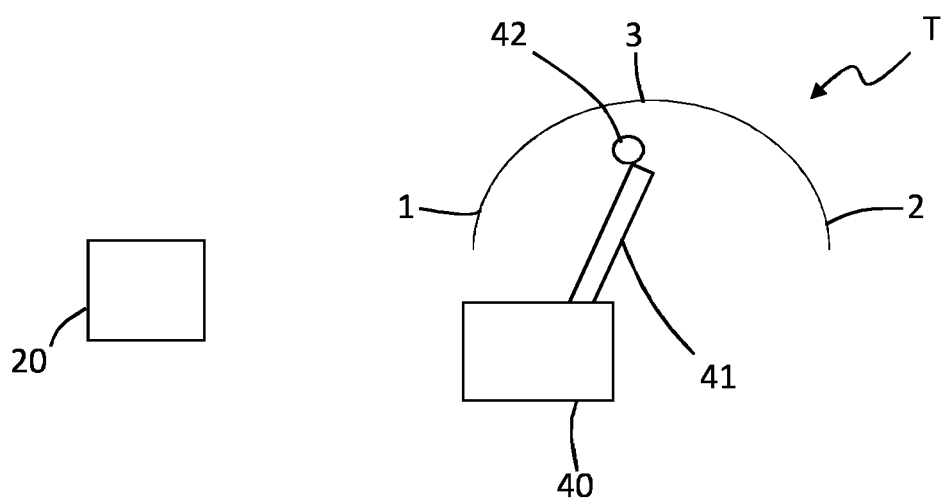
FIG. 3 is a simplified schematic view of the tyre shown in FIG. 1 comprising further components.

Referring now to FIGS. 1 to 3, there is shown a tyre T according to an embodiment of the invention. The tyre T comprises first and second side walls 1, 2 with a contact wall 3 extending therebetween. The first and second side walls 1, 2 and contact wall 3 comprise a carcass C of plys of elastomeric material with a liner L extending across the inner surface of the walls to seal the tyre T. The tyre T is shown fitted to a wheel rim WR in FIG. 1.

The contact wall 3 comprises a tread band 30 on its external surface, comprising first, second and central tread portions 30*a*, 30*b*, 30*c*, in this embodiment. The tread portions 30*a*, 30*b*, 30*c* are selected to provide a relatively increased coefficient of friction, in this embodiment. In this embodiment, the first and second tread portions 30*a*, 30*b* are formed from a compound of material having a relatively lower wear resistance and a relatively higher coefficient of friction than is the compound of material from which the central tread portion 30*c* is formed. In embodiments, however, the tread portions 30*a*, 30*b*, 30*c* may be made from the same compound of material.

Plural chambers 4, 5, 6 are defined within the tyre T. A main chamber 4 extends from the first side wall 1 to the second side wall 2 and comprises a majority of the internal volume of the tyre T, in this embodiment. Side chambers 5 are located on either side of the tyre T (e.g. adjacent the side walls 1, 2). Central chambers 6 are located between the side chambers 5 and adjacent the contact wall 3.

The side chambers 5 and central chambers 6 may be formed by any suitable means. In some embodiment, the chambers 5, 6 may be formed separately and then bonded to an inner surface of the carcass of the tyre T. Although two side chambers 5 and three central chambers 6 are shown there may be any suitable number of these chambers 5, 6 as will be appreciated by one skilled in the art. In embodiments, the tyre T may be absent side chambers 5 and/or be absent central chambers 6.

The tyre T further comprises a heater 7, which comprises a heating element 70 in this embodiment. The heating element 70 is embedded within the contact wall and comprises belting of the tyre T which also provides structural rigidity to the tyre T. The heating element 70 is operatively attached to a source of electrical energy (not shown), in this embodiment.

An insulation means comprising an insulation layer 8 is disposed within the contact wall 3 and is arranged to protect the contact wall 3 from heating by the heating element 70, in use, in this embodiment. For example, the insulation layer 8 may be arranged to protect the contact wall 3 from delamination due to heating. The insulation layer 8 may be formed of any suitable insulation material, for example a polymer or fabric having insulation properties. The insulation layer 8 extends across the width of the contact wall, from the first to the second side wall, in this embodiment. The insulation layer 8 is arranged to mitigate transmission of heat from the heater 7 to or toward the tread band 30 of the contact wall, in this embodiment.

A temperature sensor 9 is arranged to measure the temperature of the contact wall 3, in this embodiment. The temperature sensor 9 is shown embedded in the contact wall 3 of the tyre T, however this need not be the case and, instead the temperature sensor 9 may be located at any suitable location to directly measure the temperature of the contact wall 3. In embodiments, there may be plural temperature sensors, for example which may be arranged to measure the temperature of different parts of the tyre T (for example different walls 1, 2, 3 thereof). In embodiments, the temperature sensor 9 may be arranged to measure the temperature of the first and/or second side wall, in addition to or alternatively to the contact wall 3. The temperature sensor 9 is a thermocouple in this embodiment.

Air pressure within the chambers 4, 5, 6 is altered, in use, by a pumping system 40 comprising a pump 40 which may comprise any suitable pump, for example a piston pump. The pump 40 is located outside of the tyre T in this embodiment. In embodiments, however, the pump 40 may be located inside of the tyre T.

The present embodiment comprises a control unit 20, inside or outside of the tyre T, which is configured to control the pressure of fluid within the chambers 4, 5, 6. A valving system 42 in the tyre T selectively allows and prevents the flow of fluid into and/or out of the chambers 4, 5, 6 thereby allowing inflation and deflation thereof. The control unit 20 is operably connected to the pump 40 of the pumping system 40 and the valving system 42.

The tyre T may comprise a manifold 41 or other fluid communication assembly arranged to direct fluid flow into and/or out of the chambers 5, 6 (and optionally main chamber 4) and to/from the pump 40. The tyre T may comprise a source of fluid (not shown) which may be arranged to supply fluid to and/or receive fluid from the chambers 4, 5, 6. Such a source of fluid may be external or internal to the tyre T and may comprise a pressurised container, for example.

The internal volumes of chambers 5, 6 may be configured and/or selected such that fluid can be transferred from one chamber 5 to one or more of the other chambers 5, 6, in use, to inflate said one or more of the other chambers 5, 6 without needing to access fluid from the main chamber 4 or a source of fluid (not shown). Alternatively or additionally, fluid may be taken from the main chamber 4 and redistributed to one or more of the chambers 5, 6 (or vice versa). By utilising adaptable valves (e.g. three way valves) the air flow network between chambers 4, 5, 6 can be simplified. Pressure transfer from and/or to the main chamber 4 can be used as an additional fluid supply, for example under rapid pressure change requirements.

The tyre T may comprise a sensor for sensing a rolling condition of the tyre. The rolling condition may, for example, comprise the inclination or declination of a surface over which the tyre is rolling or may roll (e.g. is about to roll). The sensor may comprise an accelerometer and/or image sensing means such as one or more cameras. The control unit 20 may receive rolling condition data from the sensor (e.g. the inclination or declination of a surface over which the tyre is rolling) and may operate the pump 40 to alter the pressure in one or more of the chambers 4, 5, 6.

In use, the temperature sensor 9 measures the temperature of the contact wall 3 and transmits this information to the control unit 20. If the temperature of the contact wall 3 is below a threshold temperature (e.g. a pre-set threshold temperature) the control unit 20 operates the heater 7 to heat the contact wall 3. Electrical energy is supplied via an electrical connection to the heating elements 70 of the heater, which resistively generate heat. The heated heating elements 70 transfer thermal energy to the contact wall 3 via conduction and radiation. Provision of the insulation layer 8 advantageously reduces heat losses from the contact wall 3 to the ambient surrounds of the tyre T (for example into a surface against which the tyre T is rolling). The quantity of thermal energy required is thereby relatively reduced and, beneficially, heating of the contact wall 3 to or toward a desired temperature (e.g. the threshold temperature) is therefore relatively more rapid and requires a relatively reduced quantity of electrical energy to be maintained. The heater may consume about 1 kW of electrical power. Additionally, the insulation layer 8 may beneficially improve thermal distribution through the contact wall 3 of the tyre T by aiding retention of thermal energy therewithin. Furthermore, provision of the insulation layer 9 may mitigate the transmission of heat from the heater 7 to the tread band 30, thereby helping to maintain its rigidity and hence its grip against a rolling surface. Yet further, the insulation layer 8 may reduce incidence of delamination of the tyre T by relatively reducing (with respect to a tyre T absent such an insulation layer 8) the flow of thermal energy through the layers of the tyre T.

When the measured temperature of the contact wall 3 is less than or equal to the threshold temperature the control unit 20 operates the heater 7 to stop heating the contact wall 3. Advantageously, heating the contact wall 3 (and/or the first side wall 1 and/or second side wall 2) relatively reduces the pressure change required in the chambers 5, 6 to generate a given amount of deformation of the external shape of the tyre T. Accordingly, a relatively less powerful pump 40 may be used and/or less energy may be required to operate the pump 40. Additionally, we have found that the tyre T is more reactive to changes of pressure in the chambers 5, 6 during 'cold' conditions, for example where the ambient temperature is relatively cold (e.g. below 10 degrees centigrade) or where the tyre T has not rolled over a surface for an extended period of time such as when a vehicle to which the tyre is attached has been stationary for an extended period of time (e.g. parked over-night).

In embodiments, the control unit 20 may be configured to operate the tyre T according to different operating modes. For example, the control unit 20 may be configured to switch the tyre T between different operating modes, such as an economy mode, a performance mode and an off-road mode.

In an economy mode the main chamber 4 may have a relatively high pressure and the side and/or central chambers 5, 6 may have a relatively lower pressure, thereby promoting contact of the central portion 30*c* of the tread band 30 with a surface over which the tyre T is rolling, whilst minimising contact of the first and second portions 30*a*, 30*b* of the tread band 30 with said surface. Advantageously, the lower wear resistance material of the first and second portions 30*a*, 30*b* of the tread band 30 may be at least partially protected from wear against the surface over which the tyre is rolling. Additionally, the rolling resistance of the tyre T against the surface may be relatively reduced due to reduced contact with the material of the first and second portions 30*a*, 30*b* which has a relatively higher coefficient of friction. Accordingly, operating costs (e.g. energy costs) of the vehicle may be relatively reduced in this mode.

In a performance mode the side chamber 5 (and optionally one or more of the central chambers 6) may have a relatively higher pressure (than in economy mode). In embodiments, the main chamber 4 may have a relatively reduced pressure. The external shape of the tyre T may be altered by this pressure distribution to relatively increase contact of the first and second portions 30*a*, 30*b* of the tread band 30 with a surface over which the tyre T is rolling. Advantageously, additional grip and stiffness of the tyre T with the surface may be provided by this arrangement, due to the relatively higher coefficient of friction of the material from which the first and second portions 30*a*, 30*b* of the tread band 30 are formed. Such a mode may be particularly advantageous during cornering, heavy breaking, acceleration and the like, where the tyre T may be subjected to relatively high forces from friction against the surface over which it is rolling. As will be appreciated, the pressure in the chambers 4, 5, 6 may be altered such that a greater proportion of the first portion 30*a* of the tread band 30 is in contact with the surface over which the tyre T is rolling than is the second portion 30*b* of the tread band 30, or vice versa (for example for cornering).

In an off-road mode the central chambers 6 (and optionally the side chambers 5) may have a relatively low pressure (e.g. lower than in economy and performance modes) whilst the main chamber 4 may have a relatively high pressure (with respect to the central chambers 6 and side chambers 6). In this way the contact wall 3 may more readily deform upon contacting bumps and/or objects on the surface over which the tyre T is rolling. Beneficially, this may reduce the effect of the unevenness of the surface and hence enhance the comfort of occupants of a vehicle to which the tyre T is attached. Additionally, the grip of the tyre T with the uneven surface may be relatively enhanced by such a pressure distribution within the chambers 4, 5, 6.

Figure 4:
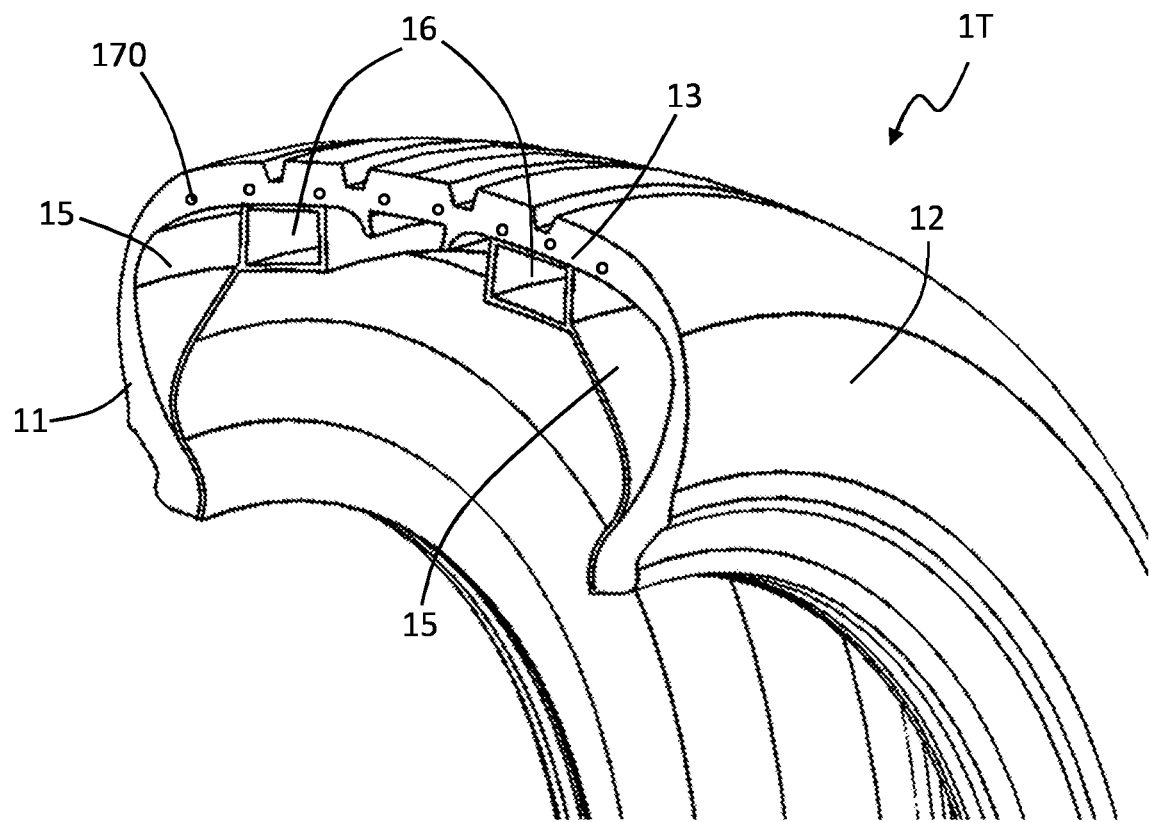
FIG. 4 is partial cut-away perspective view of a tyre according to a further embodiment of the invention.

Referring now to FIG. 4, there is shown a tyre 1T according to a further embodiment of the invention, wherein like features to those described in respect of the tyre T shown in FIGS. 1 and 2 are denoted by like references preceded by a '1' and will not be described herein further. The tyre 1T shown in FIG. 3 differs from that shown in FIGS. 1 and 2 in that only two central chambers 16 are provided.

It will be appreciated by those skilled in the art that several variations to the aforementioned embodiments are envisaged without departing from the scope of the invention. For example, although the heater 7 is shown as comprising a heating element 70 comprising belting of the Tyre this need not be the case and, instead, the heating element 70 may be in addition to or provided instead of the belting. Alternatively, the heater 7 may comprise an alternative means for heating the first side wall 1, second side wall 2 and/or contact wall 3. For example, in embodiments, the heater 7 may comprise conduits through which a heated medium (e.g. a heated fluid) is passed to exchange heat with the first side wall 1, second side wall 2 and/or contact wall 3.

Additionally or alternatively, in embodiments the tyre T, 1T may be provided absent the chambers 5, 6, 15, 16.

Additionally or alternatively, in embodiments, the tyre T, 1T may not include the insulation layer 8. Additionally or alternatively, although the insulation means comprises an insulation layer 8 is described as being arranged to mitigate transmission of heat from the heater 7 to the tread band 30 and extending across the width of the contact wall 3 from the first side wall 1 to the second side wall 2 this need not be the case and, instead, the insulation layer 8 (or other suitable insulation means) may extend across only a portion of the width of the contact wall 3 between the first and second side walls 1, 2 and/or may be arranged to mitigate transmission of heat from the heater 7 to only the central portion 30c of the tread band 30 or only the first and/or second portion 30a, 30b of the tread band 30.

Additionally or alternatively, in embodiments, the tyre T, 1T may not include a tread band 30.

Additionally or alternatively, although the temperature sensor 9 is described as being a thermocouple this need not be the case and, instead, the temperature sensor 9 may comprise any suitable type of temperature sensor such as a resistive temperature device (e.g. a thermistor), an infrared radiator, a bimetallic device, a liquid expansion device and the like. Additionally or alternatively, although the temperature sensor 9 is described as directly measuring the temperature of the contact wall 3 this need not be the case and, instead, the temperature sensor 9 may indirectly measure the temperature of the contact wall 3, for example by measuring the temperature of the heating element 70 and/or of a component adjacent the contact wall 3. In some embodiments, the temperature sensor 72 may be configured to determine the resistance of the heating element, from which the resistivity of the heating element can be calculated (by knowing the length and cross-sectional area thereof). The temperature of the heating element 70 can be calculated from the calculated resistivity or from a look-up table of temperature against resistivity performance of the heating element previously determined.

It will also be appreciated by those skilled in the art that any number of combinations of the aforementioned features and/or those shown in the appended drawings provide clear advantages over the prior art and are therefore within the scope of the invention described herein.

The invention claimed is:

1. A tyre for adaptively adjusting to rolling conditions of the tyre, the tyre comprising first and second side walls with a contact wall extending therebetween, the contact wall comprising a tread band located on an external surface thereof, the tyre further comprising a heater for heating one or more of the first side wall, second side wall and contact wall, wherein the heater comprises a heating element which comprises a belt of the tyre, wherein plural chambers are defined within the tyre, one or more of which is selectively inflatable for altering the external shape of the first side wall, second side wall and/or contact wall, wherein the belt is located between the plural chambers and the tread band;

the tyre further comprising an insulation layer disposed within the contact wall, between the heating element and the tread band, the insulation layer being arranged to protect the tread band from heating by the heating element.

2. Tyre according to claim 1, comprising an inflation mechanism for inflating one or more of the plural chambers.

3. Tyre according to claim 2, wherein the inflation mechanism comprises a pump.

4. Tyre according to claim 2, comprising a controller for controlling the pressure of fluid within one or more of the plural chambers, where the controller is configured or configurable to control the inflation mechanism to inflate or deflate one or more of the plural chambers in response to a tyre rolling condition.

5. Tyre according to claim 4, wherein the controller is for controlling the heater for heating the first side wall, second side wall and/or contact wall.

6. Tyre according to claim 1, wherein the tread band comprises a first portion formed of a first material and a second portion formed of a second, different, material.

7. Tyre according to claim 6, wherein the first material has a relatively lower wear resistance than does the second material.

8. Tyre according to claim 6, wherein the first portion is located at or adjacent the first and/or second side walls of the tyre.

9. Tyre according to claim 6, wherein the second portion is located at or adjacent a central region of the contact wall of the tyre.

10. Tyre according claim 1, comprising a sensor for sensing one or more tyre rolling conditions of the tyre.

11. Tyre as recited in claim 1, wherein the insulation layer is comprised of a fabric or polymer material having insulative properties.

12. Tyre as recited in claim 1, wherein the insulation layer extends across a portion of a width of the contact wall from the first side wall to the second side wall.

13. Tyre as recited in claim 12, wherein the insulation layer extends across an entire width of the contact wall from the first side wall to the second side wall.

14. A tyre for adaptively adjusting to rolling conditions of the tyre, the tyre comprising first and second side walls with a contact wall extending therebetween, the contact wall comprising a tread band located on an external surface thereof, the tyre further comprising a heater for heating one or more of the first side wall, second side wall and contact wall, wherein the heater comprises a heating element which comprises a belt of the tyre, wherein plural chambers are defined within the tyre, one or more of which is selectively inflatable for altering the external shape of the first side wall and/or the second side wall, wherein the belt is located between the plural chambers and the tread band;

the tyre further comprising an insulation layer disposed within the contact wall, between the heating element and the tread band, the insulation layer being arranged to protect the tread band from heating by the heating element.

15. Tyre as recited in claim 14, wherein the insulation layer is comprised of a fabric or polymer material having insulative properties.

16. Tyre as recited in claim 14, wherein the insulation layer extends across a portion of a width of the contact wall from the first side wall to the second side wall.

17. Tyre as recited in claim 14, wherein the insulation layer extends across an entire width of the contact wall from the first side wall to the second side wall.

* * * * *